United States Patent [19]

Cassidy et al.

[11] 4,386,852

[45] Jun. 7, 1983

[54] PHASE SYNCHRONIZATION APPARATUS

[75] Inventors: Joseph A. Cassidy, Trumbull; Paul C. Talmadge, Ansonia, both of Conn.

[73] Assignee: The Perkin-Elmer Corporation, Norwalk, Conn.

[21] Appl. No.: 229,683

[22] Filed: Jan. 29, 1981

[51] Int. Cl.³ ............................ G01J 3/02; G01J 3/42
[52] U.S. Cl. .................................................... 356/323
[58] Field of Search ............................... 356/323–325; 250/343, 345

[56] References Cited

U.S. PATENT DOCUMENTS 3,659,942  5/1972  Vergato .......................... 356/325 X
3,895,874  7/1975  Ogiwara .............................. 356/325
4,035,086  7/1977  Schoeffel et al. ............... 356/325 X Primary Examiner—F. L. Evans
Attorney, Agent, or Firm—S. A. Giarratana; F. L. Masselle; R. A. Hays

[57] ABSTRACT

A phase synchronization apparatus useful for synchronizing the sample signal and the demodulation signal at a spectrometer includes a stepper motor the position of which is controlled so that the desired phase synchronization is ensured.

6 Claims, 3 Drawing Figures

PHASE SYNCHRONIZATION APPARATUS

BACKGROUND OF THE INVENTION

The present invention generally relates to a phase synchronization apparatus and, in particular, relates to such an apparatus for use in a spectrometer.

In conventional spectrometers information of interest about a sample material under test is conveyed to a detector mechanism by means of a beam of light radiation. The beam of light radiation acquires the information as it passes through the sample material. Usually, for reasons well known in the art, the beam of light radiation is initially passed through the blades of a mechanical chopper and thus can be envisioned as a train of pulses. In many conventional spectrometers the train of light pulses, after passing through the sample under test, impinges upon a detector which, responsive to the light pulses, produces a pulsed electronic signal. The resultant pulsed electronic signal from the detector has, due to the pulsed nature of the beam, a periodic waveform which can be described as being equal in frequency with the train of light pulses.

In order to extract sample information from the periodic electronic signal of the sample detector it is necessary to demodulate that signal. Demodulation, in this instance, effectively involves subtracting an electronic signal representative of the beam of light radiation before it passes through the sample from the electronic signal from the detector to leave, as a remainder, only the sample information carried by the beam. The maximum sample information is extracted when the electronic signal representative of the beam of light radiation before it passes through the sample, commonly known as the reference, or demodulation, signal is exactly in phase with the periodic, or sample, signal from the detector.

Normally, a photodetector is adapted to produce an electronic signal which has the same frequency as the light pulses impinging on the photodetector. This can be accomplished by positioning the photodetector near the light chopper. Difficulties arise, however, by errors in the position of the photodetector. In one configuration, the photodetector is positioned on the sample side of the light chopper, the electronic signal thus produced will be approximately in phase with the sample signal from the sample detector. Alternatively, if the photodetector is arranged so as to receive light pulses only when the beam does not pass the chopper, then the signal from the photodetector and the signal from the sample detector will be approximately 180° out-of-phase. However, the above-stated phase relationships are only valid and practical if it is assumed that the relevant optical paths are equal and that phase lead or lag in any associated electronic equipment is negligible. The phase lead or lag in the associated electronic equipment is, due to the relatively low frequency of the signals, i.e. about 15 HZ, in fact, negligible. Of course, by judiciously positioning the photodetector, some of the phase errors can be reduced. Nevertheless, the photodetector is conventionally a factory adjusted item and thus, in addition to the inherent positioning error, the degree of error varies with the frequency of the beam from the light source. As a result, the sample signal is not maximally demodulated. This results in a loss of sample information and thus the sensitivity of the entire instrument is reduced.

SUMMARY OF THE INVENTION

In view of the foregoing it is one object of the present invention to provide an apparatus for use in a spectrometer to phase synchronize the reference, or demodulation, signal with a sample information carrying signal. This object is accomplished in part by an apparatus wherein the position of a stepper motor is phase synchronized with an electronic signal representative of the sample signal.

Other objects and advantages will become apparent from the following drawing and detailed specification.

DETAILED DESCRIPTION OF THE INVENTION

Figure 1:
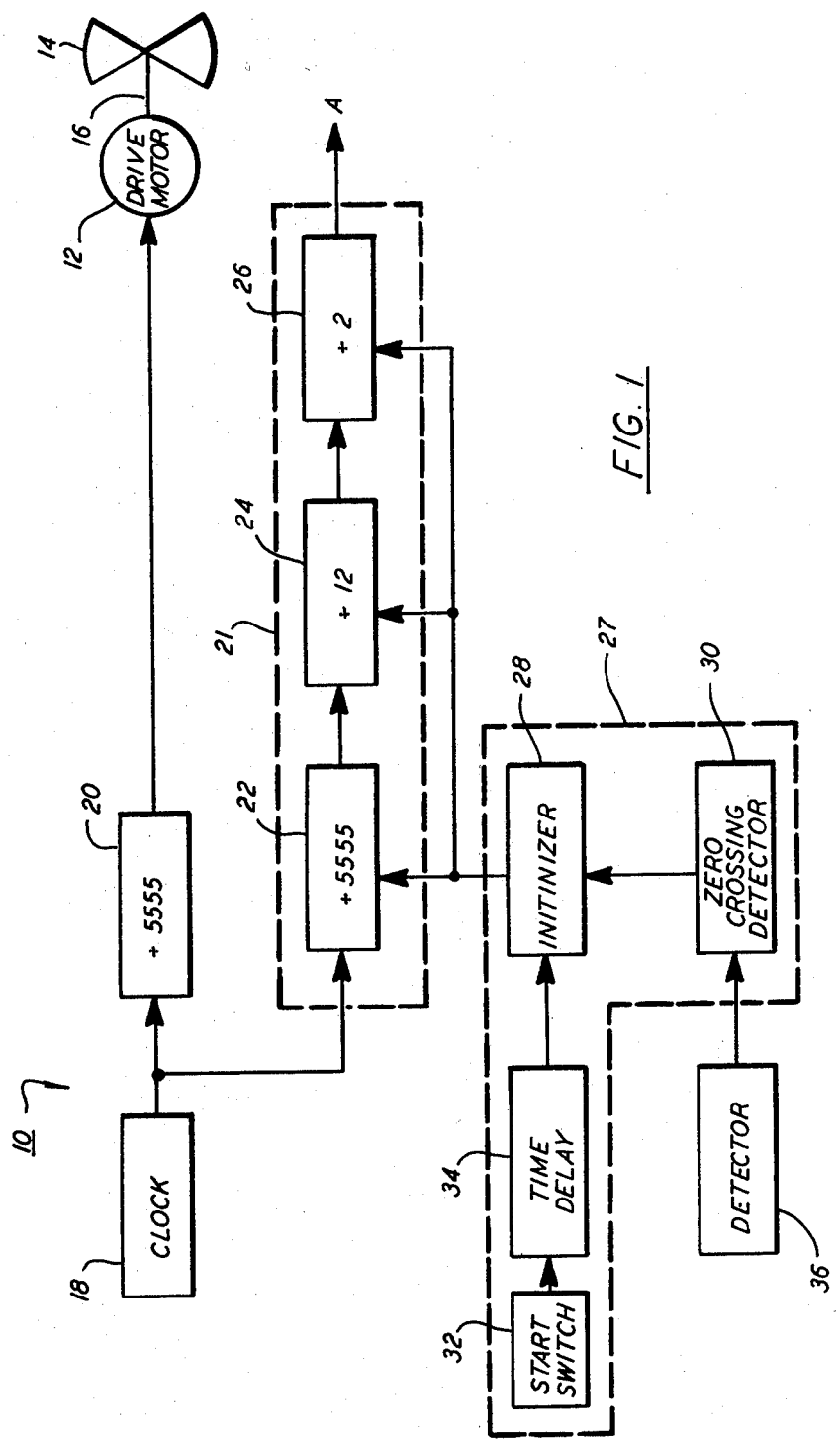
FIG. 1 is a block diagram of an apparatus embodying the principles of the present invention.

An apparatus, generally indicated at 10 in FIG. 1, embodying the principles of the present invention, includes a drive motor 12 having a light beam chopper 14 affixed to a rotatable drive shaft 16 thereof. In the preferred embodiment, the drive motor 12 is a stepper motor and rotates in incremental steps of equal angular rotation.

The motor 12 rotates in response to a pulsed, or at least a periodic, electronic signal. Further, the motor 12 is adapted to rotate through one incremental step for each pulse delivered thereto.

A pulsed signal is, in one embodiment, provided to the motor 12 by an electronic clock 18 mechanism. Such a clock 18 is designed to put out a continuous train of pulses at a preselected frequency. Normally the frequency of the clock far exceeds the practical responsive ability of the motor 12. Hence, a means 20 is provided for reducing the frequency of the clock 18. The means 20 can be implemented by use of an electronic counter. As well known, an electronic counter, useful as a frequency divider, is a device which produces an output pulse only after receiving a larger, preselected, number of pulses from, for example, a clock.

The apparatus 10 further includes a means 21 for generating a reference, or demodulation, signal which signal can be adapted, in conventional fashion, to be used to extract sample information from a sample signal. In the present embodiment, the means 21 for generating the reference signal includes three counters 22, 24 and 26 functionally serially connected with the clock 18. Preferably, the counters 22, 24 and 26 operate in a manner similar to the means 20. In fact, it is preferred that the means 20 and the counter 22 be substantially identical to each other. The means 21 is controlled by a means 27 for initiating the generation of the reference, or demodulation, signal.

In a preferred embodiment, the initiating means 27 includes an initializer 28 which is effectively activated, after a predetermined time delay, represented at 34, via a start switch means 32. Of course, the time delay 34 can be implemented by any means known in the art and, in fact, can be effected in a straightforward manner by known R-C configurations. The start switch means 32 can be a simple mechanical push button or a sophisticated electronic device triggered by an electronic signal derived from any related circuitry.

Upon activation, the initializer 28 resets the counters 22, 24 and 26 of the means 21 to a new position. Thereafter, the means 21 is armed to initiate a reference, or demodulation, signal upon receiving an electronic command from the initializer 28. In order to ensure the phase synchronization desired, the command signal from the initializer 28 is responsive to a signal representative of the sample signal. This representative signal is derived from a zero crossing detector 30. The zero crossing detector 30 is a device, the configuration and implementation of which is known in the art, which produces an output each time the input signal thereto reaches an arbitrary reference level. Hence, if the input to the zero crossing detector 30 is a sine wave of a given frequency the output thereof is a pulse train of the same frequency. The input signal to the zero crossing detector 30, representative of the sample signal, can easily be derived using known optical to electronic signal converters. As mentioned above, the optical signal which is directed through the sample material and which is thereafter projected onto the detector 36 is pulsed and thus has a preselected frequency.

In one specific embodiment the apparatus 10 is used as part of an atomic spectrometer. The spectrometer utilizes an optical signal passed through the sample material under test to provide elemental information about the sample material. The optical signal enters the spectrometer from a source (not shown) and is effectively converted to a pulsed signal via the chopper 14. The position of the chopper 14 is controlled by a stepper motor 12 which has forty-eight (48) steps per revolution. In this instance a "butterfly" type chopper is used which effectively results in two light beam pulses per revolution of the shaft 16.

The stepper motor 12 is incrementally stepped, or rotated, in response to a pulsed signal produced via the clock 18. For convenience, a 2 MHz clock driver has been used, although other clock rates could also be implemented. The 2 MHz signal is divided down to 360 Hz by the counter 20 which serves as a divide-by-5555 circuit. That is, for every 5555 pulses entering the counter 20 from the 2 MHz clock, one pulse is provided to the stepper motor 12 which rotates one increment, i.e. 1/48 of a revolution, in response thereto. Thus, the stepper motor 12 is incremented 360 times in one second. This is equivalent to a frequency of 7.5 revolutions/second. However, in a practial sense, since the chopper light beam 14 is such that it allows light transmission therethrough twice per revolution, the effective frequency of the light beam is 15 pulses per second, i.e. 15 Hz. Hence, the optical beam which is passed through the sample material, using conventional techniques, impinges upon the detector 36 at a frequency of 15 Hz.

The detector 36 can be any conventional mechanism known in the art, such as any optical to electrical transducer, a thermocouple which thermally reacts to the intensity of optical beams, or the like. As stated above, for optimum measurement accuracy, the sample signal generated by the detector 36 must be phase synchronized with a demodulation, or reference, signal which, in the present embodiment, is developed at the output of counter 26, indicated as point A' in FIG. 1.

Figure 2:
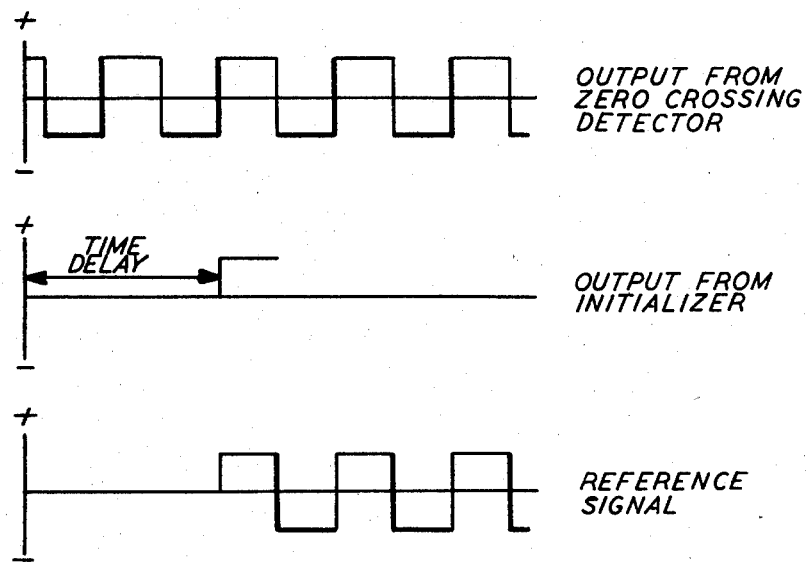
FIG. 2 is a time-based diagram reflecting the relative phase of signals at various points in the apparatus of FIG. 1.

The development of the demodulation or reference signal and the synchronization thereof with the sample signal is discussed hereinafter. The periodic electronic sample signal created by the detector 36 is monitored by a zero crossing detector 30 which responsively produces an output pulse each time the amplitude of the sample signal changes sign. Thus, the zero crossing detector 30, which can be any conventional zero crossing detector, produces an output pulse having the same frequency as the frequency of the sample signal. In addition, a conventional zero-crossing detector 30 produces a positive pulse when the input amplitude changes from negative to positive and a negative pulse when its input amplitude changes from positive to negative. Hence, the output of the zero crossing detector 30, as shown in FIG. 2, is indicative of not only the frequency of the sample signal but also the phase thereof.

Figure 3:
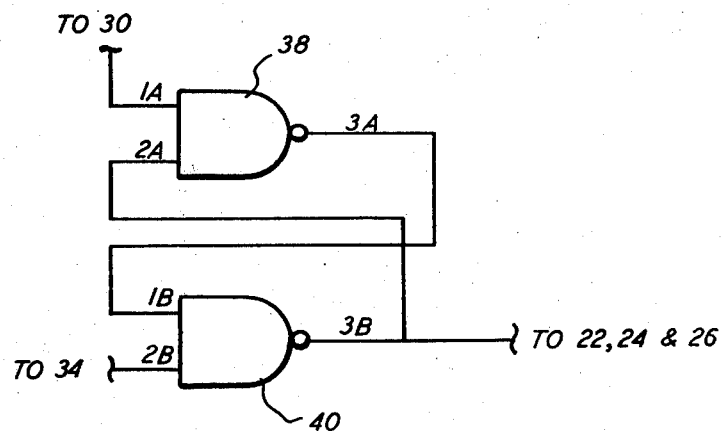
FIG. 3 is a circuit diagram of an initializer embodying the principles of the present invention.

An example of a particular segment of the initializer 28 is shown in FIG. 3. Therein NAND gates 38 and 40 are interconnected to substantially permit the initializing signal desired. Each NAND gate includes two inputs and a single output. For example, the NAND gate 38 includes inputs 1A and 2A and an output 3A. The NAND gate 40 is comprised of inputs 1B and 2B and an output 3B. As readily seen from the diagram of FIG. 3, the output of the first NAND gate 38 is connected to one of the inputs of the second NAND gate 40. In addition, the output of the second NAND gate 40 is connected to one of the inputs of the first NAND gate 38. The remaining input to the first NAND gate 38 is adapted to receive the signal derived from the zero crossing detector 30. The remaining input to the second NAND gate 40 is adapted to receive a signal from the power switch 32 and time delay 34 circuitry. The output of the second NAND gate 40 provides the initiating command pulse to the means 21 (specifically, the counters 22, 24 and 26). As well known in the art, but nevertheless of sufficient interest that it should be reviewed here, the truth table for a NAND gate is as presented below in Table 1 wherein the H's indicate a logic HIGH and the L's indicated a logic LOW.

TABLE 1

| 1 | 2 | 3 |
|---|---|---|
| H | H | L |
| H | L | H |
| L | H | H |
| L | L | H |

As presented hereinafter, Table 2 is the truth table for the configured arrangement described above and as shown in FIG. 3.

TABLE 2

|   | 1A | 2A | 3A | 1B | 2B | 3B |
|---|----|----|----|----|----|----|
| 1.| H  | H  | L  | L  | L  | H  |
| 2.| H  | H  | L  | L  | H  | H  |
| 3.| L  | H  | H  | H  | H  | L  |

The three steps as indicated on the left are various procedural steps for the operation of a machine including the present invention. For example, when the power is initially turned on, the logic conditions as given in Step 1 prevail in the initializer 28. After the predetermined time delay, for example wherein a particular capacitor is fully charged, i.e. step 2, the input to the 2B portion of NAND gate 40 changes from a LOW to a HIGH. As a result, the circuit is armed so that when a pulse is received at input 1A of NAND gate 38 from the zero crossing detector which changes the condition thereof from a logical HIGH to a logical LOW, the output from the first NAND gate changes from a logical LOW to a logical HIGH. As a consequence, the input to 1B of the second NAND gate 40 changes from a logical LOW to a logical HIGH and the output of the second NAND gate 40 changes from a logical HIGH to a logical LOW. This change is representative of a single pulse and permits the counters 22, 24 and 26 to begin counting pulses from the clock 18. As a result, the reference pulse is phase synchronized with the sample signal.

In practical operation, the spectrometer is turned on and allowed to stabilize prior to the phase synchronization of the sample signal and the reference signal. After stabilization the start switch 32 is activated and the counters 22, 24 and 26 are set to zero. When the time delay elapses a signal initiates counting in the counters 22, 24 and 26 which counting is responsive to the 2 MHz clock 18 controlling the stepper motor 12. Since the clock 18 provides both the control signal to the stepper motor 12 and the signal to the counters 22, 24 and 26 for creating the reference signal and since, after reset and initialization, the reference signal is in phase with the optical signal it is preferred that the counters 20 and 22 be identical.

The various elements discussed herein can be practically implemented in any manner known in the art. For example, the clock 18 can be a pulse generator or a semiconductor device using conventional well known circuitry. In fact, some of the elements may be implemented by the use of a microprocessor instead of discrete elements.

Those skilled in the art will recognize that the present specification has been made by way of example and that numerous changes can be made without departing from the spirit and scope of the present invention which is intended to be limited solely by the appended claims and the reasonable interpretation thereof.

What is claimed is:

1. Apparatus for phase synchronizing a sample signal and a demodulation signal in a spectroscopic analytical instrument, said apparatus comprising:

an incrementally steppable motor having a light beam chopper affixed to the shaft thereof whereby when said chopper is placed in the path of a light beam, said light beam is interrupted, thus resulting in a pulsed light beam having a frequency associated therewith;

means, responsive to said pulsed light beam, for producing an electronic sample signal having the same frequency as said pulsed light beam; said electronic sample signal being phase synchronized with said pulsed light beam;

means, including a plurality of serially connected counters, for producing an electronic demodulation signal, said counters producing, upon initiation, a demodulation signal having the same frequency as that of said pulsed light beam; and means, responsive to the phase of said sample signal, for initiating said demodulation signal producing means whereby said demodulation signal and said sample signal are phase synchronized.

2. Apparatus as claimed in claim 1 wherein said motor rotation is controlled by a first signal said signal being derived from a comparatively high frequency clock signal having a means for reducing the frequency thereof prior to said signal incrementing said motor.

3. Apparatus as claimed in claim 1 wherein said sample signal producing means includes an optical detector transducer for transforming said light bem into an output electronic signal having the same frequency as said light beam.

4. Apparatus as claimed in claim 1 wherein said sample signal producing means includes a thermocouple transducer for transforming said light beam into an output electronic signal having the same frequency as said light beam.

5. Apparatus as claimed in claim 3 or 4 wherein said producing means further includes a zero crossing detector which transforms said output electronic signal into said electronic sample signal, said electronic sample signal being phase synchronized with said light beam.

6. Apparatus as claimed in claim 5 wherein said initiating means provides a command signal to said generating means, said command signal being responsive to and phase synchronized with said sample signal.

* * * * *

UNITED STATES PATENT AND TRADEMARK OFFICE
CERTIFICATE OF CORRECTION

PATENT NO. : 4,386,852
DATED : June 7, 1983
INVENTOR(S) : Joseph A. Cassidy and Paul C. Talmadge It is certified that error appears in the above–identified patent and that said Letters Patent are hereby corrected as shown below:

Column 6, Line 25, please delete "bem" and insert --beam--.

Signed and Sealed this

Seventh Day of February 1984

[SEAL]

Attest:

Attesting Officer

GERALD J. MOSSINGHOFF

Commissioner of Patents and Trademarks